US012669735B2

(12) United States Patent  
Hisanaga et al.

(10) Patent No.: US 12,669,735 B2  
(45) Date of Patent: Jun. 30, 2026

(54) WAVELENGTH SELECTIVE SWITCH

(71) Applicant: FUJIFILM Corporation, Tokyo (JP)

(72) Inventors: Kazuya Hisanaga, Minamiashigara (JP); Yukito Saitoh, Minamiashigara (JP); Yujiro Yanai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 211 days.

(21) Appl. No.: 18/774,749

(22) Filed: Jul. 16, 2024

(65) Prior Publication Data

US 2024/0369900 A1 Nov. 7, 2024

Related U.S. Application Data

(63) Continuation of application No. PCT/JP2023/001181, filed on Jan. 17, 2023.

(30) Foreign Application Priority Data

| | | |
|---|---|---|
| Jan. 17, 2022 | (JP) | 2022-005181 |
| May 12, 2022 | (JP) | 2022-078685 |
| Sep. 30, 2022 | (JP) | 2022-158304 |

(51) Int. Cl.  
*G02F 1/31* (2006.01)

(52) U.S. Cl.  
CPC ..................................... *G02F 1/31* (2013.01)

(58) Field of Classification Search  
CPC .......................................................... G02F 1/31  
USPC .......................................................... 359/320  
See application file for complete search history.

(56) References Cited

U.S. PATENT DOCUMENTS

| | | |
|---|---|---|
| 2005/0276537 A1 | 12/2005 | Frisken |
| 2009/0244415 A1 | 10/2009 | Ide |
| 2021/0033765 A1 | 2/2021 | Sato et al. |
| | (Continued) | |

FOREIGN PATENT DOCUMENTS

| | | |
|---|---|---|
| JP | 2008-122856 A | 5/2008 |
| JP | 2017-54004 A | 3/2017 |
| | (Continued) | |

OTHER PUBLICATIONS

International Preliminary Report on Patentability and Written Opinion of the International Searching Authority for International Application No. PCT/JP2023/001181, dated Aug. 2, 2024, with an English translation.

(Continued)

*Primary Examiner* — William Choi  
(74) *Attorney, Agent, or Firm* — Birch, Stewart, Kolasch & Birch, LLP

(57) ABSTRACT

Provided is a wavelength selective switch where crosstalk is improved and miniaturization is realized. The wavelength selective switch includes: one or more input ports; one or more output ports; a polarization controller that adjusts a polarization state of light incident from the input ports; a dispersive element that demultiplexes wavelength-multiplexed light incident from the input ports; and a deflection element that controls deflection of the demultiplexed light. The dispersive element is a liquid crystal diffraction element having a liquid crystal alignment pattern where an orientation of an optical axis derived from a liquid crystal compound changes while continuously rotating in at least one in-plane direction.

20 Claims, 4 Drawing Sheets

(56)　　　　　　References Cited

U.S. PATENT DOCUMENTS

2023/0194948　A1　　6/2023　Saitoh et al.

FOREIGN PATENT DOCUMENTS

| WO | WO 2019/189675 | A1 | 10/2019 |
| WO | WO 2019/203357 | A1 | 10/2019 |

OTHER PUBLICATIONS

International Search Report for International Application No. PCT/JP2023/001181, dated Apr. 11, 2023, with English translation.

WAVELENGTH SELECTIVE SWITCH

CROSS-REFERENCE TO RELATED APPLICATIONS

This application is a Continuation of PCT International Application No. PCT/JP2023/001181 filed on Jan. 17, 2023, which claims priority under 35 U.S.C. § 119(a) to Japanese Patent Application No. 2022-005181 filed on Jan. 17, 2022, Japanese Patent Application No. 2022-078685 filed on May 12, 2022, and Japanese Patent Application No. 2022-158304 filed on Sep. 30, 2022. The above applications are hereby expressly incorporated by reference, in their entirety, into the present application.

BACKGROUND OF THE INVENTION

1. Field of the Invention

The present invention relates to a wavelength selective switch.

2. Description of the Related Art

Recently, in optical communication, high-speed communication where a decrease in communication speed does not occur is realized by transmitting an optical signal to a communication destination as it is without being converted into an electrical signal. In addition, high-capacity optical transmission can be performed using one optical fiber through a wavelength division multiplexing (WDM) technique capable of communication using a wavelength-multiplexed signal where one wavelength is associated with one optical signal. As this optical communication technique has developed, importance of the role of an optical switch that switches between routes without any change from an optical signal has increased.

As the scale of the optical communication network has increased, the number of wavelengths of an optical signal has also increased, and miniaturization and high functionality of a wavelength selective switch that selects any wavelength from several tens of wavelengths and outputs the optical signal from any of a plurality of output fibers have been required.

FIG. 1 shows a structure of a wavelength selective switch in the related art. In the wavelength selective switch, a liquid crystal on silicon (LCOS) is used as a deflection element that controls deflection of incident light.

Light input from an input port 10 is adjusted to a polarization state where a phase of a LCOS 15 can be controlled through a polarization controller 11 such as polarization diversity. In the LCOS 15, a slow axis expressed by birefringence of liquid crystal is voltage-controllable such that a phase of light having polarization matched to the slow axis can be changed. Accordingly, the polarization of incidence light is adjusted using the polarization controller 11 to be matched to the slow axis of liquid crystal.

The incidence light adjusted to the appropriate polarization is converted into parallel light through a lens 12 and is emitted to a dispersive element 13. The light is demultiplexed by the dispersive element 13 and spreads in a wavelength dispersion direction.

The spread light is demultiplexed light parallel to an optical axis through a lens 14 and is incident into the LCOS 15. The LCOS 15 imparts a phase difference to the phase of the incidence light in pixel units to form a desired deflection angle. As a result, the incidence light is reflected at the desired deflection angle, travels along a route of a broken line in FIG. 1, and is output to an output port 16. By adjusting the deflection angle of the LCOS 15, light having each of wavelengths can be switched to a desired output port among a plurality of output ports 16.

As an example of the high functionality of the wavelength selective switch using the LCOS 15, JP2017-54004A discloses a wavelength selective switch in which that prevents deterioration of crosstalk (S/N to a port that is not connected) during switching by separating an element used for deflection control and an element for intensity control from each other, using a reflective liquid crystal phase modulator for deflection control, and using a transmissive liquid crystal element for intensity control.

SUMMARY OF THE INVENTION

However, it is not preferable to newly provide the liquid crystal element for intensity control because the device size and the cost increase. In addition, it was found that a diffraction grating that is used as the dispersive element in the wavelength selective switch in the related art has a small diffraction angle, increases crosstalk due to unintended higher-order light, and is not preferable from the viewpoints of device miniaturization and high performance. Accordingly, an object of the present invention is to provide a wavelength selective switch where crosstalk is improved and miniaturization is realized.

As a result of a thorough investigation, the present inventors found that a wavelength selective switch where crosstalk is improved and miniaturization is realized can be provided with the following configuration. In this configuration, the wavelength selective switch includes: one or more input ports; one or more output ports; a polarization controller that adjusts a polarization state of light incident from the input ports; a dispersive element that demultiplexes wavelength-multiplexed light incident from the input ports; and a deflection element that controls deflection of the demultiplexed light, in which the dispersive element is a liquid crystal diffraction element having a liquid crystal alignment pattern where an orientation of an optical axis derived from a liquid crystal compound changes while continuously rotating in at least one in-plane direction.

That is, the present inventors found that the object can be achieved with the following configurations.

[1] A wavelength selective switch comprising:
one or more input ports;
one or more output ports;
a polarization controller that adjusts a polarization state of light incident from the input ports;
a dispersive element that demultiplexes wavelength-multiplexed light incident from the input ports; and
a deflection element that controls deflection of the demultiplexed light,
wherein the dispersive element is a liquid crystal diffraction element having a liquid crystal alignment pattern where an orientation of an optical axis derived from a liquid crystal compound changes while continuously rotating in at least one in-plane direction.

[2] The wavelength selective switch according to [1], in which the deflection element is a polarization control phase modulator that changes a phase of incident light based on an applied voltage to control deflection of the incident light.

[3] The wavelength selective switch according to [1] or [2], in which the liquid crystal diffraction element is a transmissive type.

[4] The wavelength selective switch according to [3], in which a difference Δn in refractive index of a liquid crystal compound used in the transmissive liquid crystal diffraction element, a film thickness d of the transmissive liquid crystal diffraction element, and a wavelength λ of incidence light satisfy Expression (1), $$\lambda/2 - \lambda/10 \le \Delta n \times d \le \lambda/2 + \lambda/10. \tag{1}$$

[5] The wavelength selective switch according to [1] or [2], in which the liquid crystal diffraction element is a reflective type.

[6] The wavelength selective switch according to [5], in which a film thickness d of the reflective liquid crystal diffraction element, an average refractive index nLC of a liquid crystal compound, and a wavelength λ of incidence light satisfy Expression (2), $$d \ge (6 \times \lambda)/nLC. \tag{2}$$

[7] The wavelength selective switch according to any one of [1] to [6], in which a light refraction member is bonded to the liquid crystal diffraction element.

[8] The wavelength selective switch according to [7], in which a λ/4 plate is provided between the liquid crystal diffraction element and the light refraction member.

[9] The wavelength selective switch according to [8], further comprising:

a first bonding layer that is provided between the liquid crystal diffraction element and the λ/4 plate; and a second bonding layer that is provided between the λ/4 plate and the light refraction member, in which a difference between a refractive index of the first bonding layer and a refractive index of the liquid crystal diffraction element is 0 to 0.1, a difference between the refractive index of the first bonding layer and a refractive index of the λ/4 plate is 0 to 0.1, a difference between a refractive index of the second bonding layer and the refractive index of the λ/4 plate is 0 to 0.1, and a difference between the refractive index of the second bonding layer and a refractive index of the light refraction member is 0 to 0.1.

According to the present invention, a wavelength selective switch where crosstalk is improved and miniaturization is realized can be provided.

DESCRIPTION OF THE PREFERRED EMBODIMENTS

Hereinafter, embodiments of the present invention will be described in detail with reference to the drawings. Note that the present invention can be implemented in various different embodiments and does not limit the following embodiments.

The drawings described below are exemplary drawings for describing the present invention, and the present invention is not limited to the drawings described below.

In addition, in the following description, a numerical range indicated by the expression "to" includes numerical values described on both sides. For example, in a case where ε is in a range of a numerical value $\varepsilon_\alpha$ to a numerical value $\varepsilon_\beta$, a range of ε is a range including the numerical value $\varepsilon_\alpha$ and the numerical value $\varepsilon_\beta$ and is represented by $\varepsilon_\alpha \le \varepsilon \le \varepsilon_\beta$ in mathematical symbols.

Unless specified otherwise, the meaning of an angle such as "an angle represented by a specific numerical value", "parallel", "vertical", or "orthogonal" includes a case where an error range is generally allowable in the technical field.

First Embodiment

Figure 1:
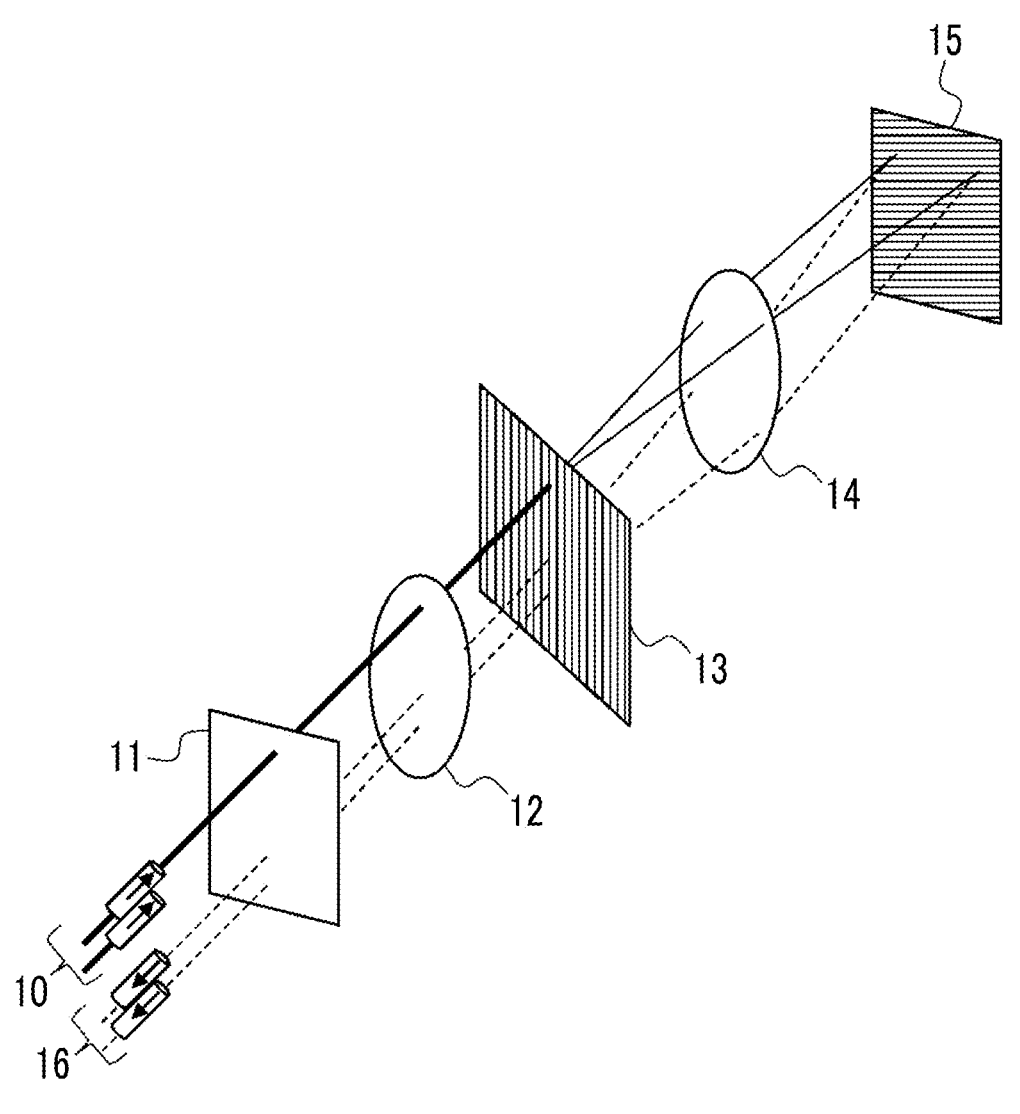
FIG. 1 is a conceptual diagram showing a configuration of a wavelength selective switch in the related art.
Figure 2:
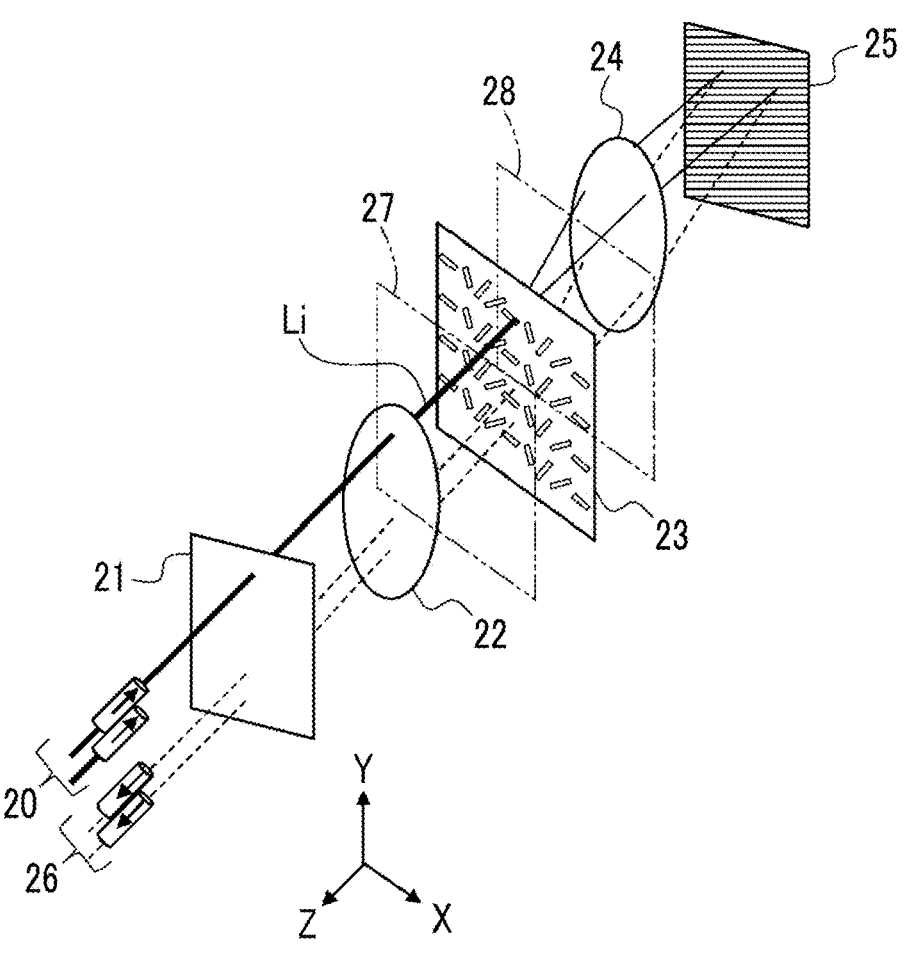
FIG. 2 is a conceptual diagram showing a configuration of a wavelength selective switch 1 according to a first embodiment of the present invention.

FIG. 2 is a conceptual diagram showing a configuration of a wavelength selective switch 1 according to a first embodiment of the present invention. The wavelength selective switch 1 includes: one or more input ports 20; one or more output ports 26; a polarization controller 21 that adjusts a polarization state of light incident from the input ports; a lens 22 that converts polarization-adjusted light into parallel light; a transmissive liquid crystal diffraction element 23 that demultiplexes wavelength-multiplexed light (incidence light Li) incident from the input ports; a lens 24 that converts light demultiplexed and spreading in a wavelength dispersion direction into parallel light; and a deflection element 25 that controls deflection of the demultiplexed light.

[Input Port]

Light (for example, signal light in wavelength multiplexing optical communication) including a plurality of wavelength components is input to the input ports 20 from the outside of the wavelength selective switch 1. The number of the input ports 20 may increase or decrease as necessary.

[Polarization Controller]

The polarization controller 21 is provided to adjust a polarization state of incidence light to a polarization direction suitable for demultiplexing or deflecting light in a case where a dispersive element or a deflection element described below has polarization dependence. As the technique for obtaining the configuration, polarization diversity is well-known. Even in the present invention, the polarization diversity is used for adjusting polarization.

[Liquid Crystal Diffraction Element]

It is preferable that the dispersive element used for the present invention is a liquid crystal diffraction element having a liquid crystal alignment pattern where an orientation of an optical axis derived from a liquid crystal compound changes while continuously rotating in at least one in-plane direction. The liquid crystal diffraction element hardly generates higher-order light during diffraction. Therefore, the occurrence of crosstalk by higher-order light in a surface relief type or volume hologram type diffraction grating used as a dispersive element in the related art can be suppressed. In the present embodiment, a transmissive liquid crystal diffraction element will be described.

Figure 3:
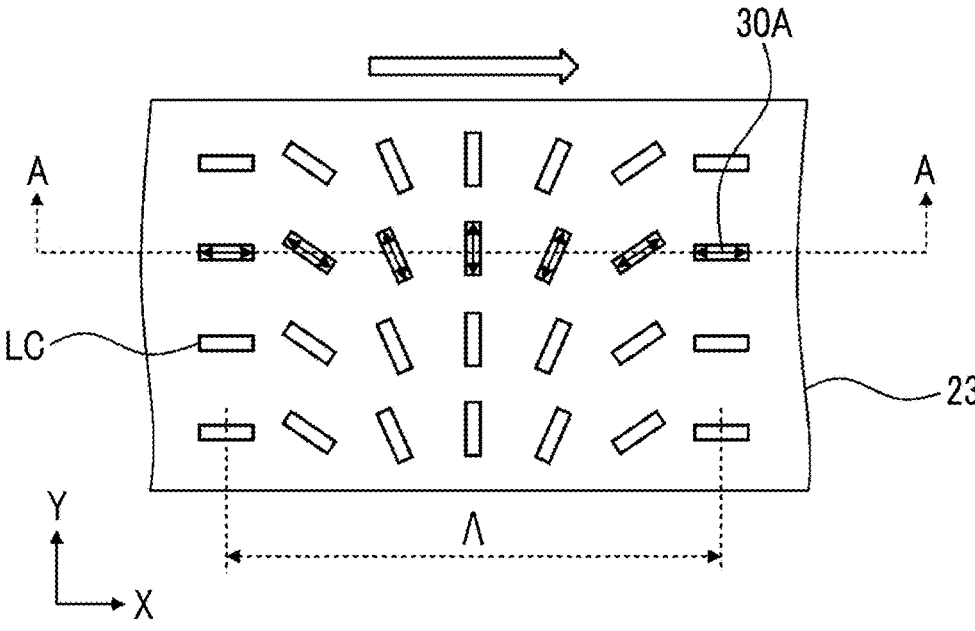
FIG. 3 is a plan view showing a liquid crystal diffraction element.

As shown in FIG. 3, a liquid crystal compound LC forming the transmissive liquid crystal diffraction element 23 has the liquid crystal alignment pattern in which an orientation of an optical axis 30A changes while continuously rotating along an X direction in an in-plane direction. In the example shown in the drawing, the liquid crystal compound LC has the liquid crystal alignment pattern in which the optical axis 30A of the liquid crystal compound LC changes while continuously rotating clockwise along the white arrow.

Specifically, "the orientation of the optical axis 30A of the liquid crystal compound LC changes while continuously rotating in the white arrow direction (the predetermined one direction)" represents that an angle between the optical axis 30A of the liquid crystal compound LC, which is arranged in the white arrow direction, and the white arrow direction varies depending on positions in the white arrow direction, and the angle between the optical axis 30A and the white arrow direction sequentially changes from θ to θ+180° or θ−180° in the white arrow direction.

On the other hand, in the liquid crystal compound LC forming the transmissive liquid crystal diffraction element 23, the orientations of the optical axes 30A are the same in a Y direction orthogonal to the X direction, that is, the Y direction orthogonal to the one direction in which the optical axis 30A continuously rotates.

In other words, in the liquid crystal compound LC forming the transmissive liquid crystal diffraction element 23, angles between the optical axes 30A of the liquid crystal compound LC and the X direction are the same in the Y direction.

In the transmissive liquid crystal diffraction element 23 used in the present invention, in the liquid crystal alignment pattern of the liquid crystal compound LC, a length (distance) over which the optical axis 30A of the liquid crystal compound LC rotates by 180° in the X direction in which the optical axis 30A changes while continuously rotating in a plane is set as a length Λ of a single period in the liquid crystal alignment pattern.

That is, a distance between centers of two liquid crystal compounds LC in the X direction is the length Λ of the single period, the two liquid crystal compounds LC having the same angle in the X direction. Specifically, as shown in FIG. 3, a distance of centers in the X direction of two liquid crystal compounds LC in which the X direction and the direction of the optical axis 30A match each other is set as the length Λ of the single period.

In the liquid crystal alignment pattern of the transmissive liquid crystal diffraction element 23, the length Λ of the single period is repeated in the X direction, that is, in the one direction in which the orientation of the optical axis 30A changes while continuously rotating.

The transmissive liquid crystal diffraction element 23 adjusts a diffraction angle by changing the length Λ of the single period in the liquid crystal alignment pattern. As the length Λ of the single period decreases, the diffraction angle increases. Therefore, the distance between the transmissive liquid crystal diffraction element 23 and the lens 24 can be reduced, and the size of the device can be reduced.

The transmissive liquid crystal diffraction element 23 can be prepared, for example, using a method described in WO20/022513A.

The transmissive liquid crystal diffraction element 23 includes a chiral agent, and an element having a structure in which liquid crystal molecules rotate in a Z direction of FIG. 2 may be used. By rotating the liquid crystal molecules in the Z direction, an effect of changing a diffraction angle or widening a wavelength range of diffracted light can be expected.

In the transmissive liquid crystal diffraction element 23, liquid crystal diffraction elements having different rotation directions in the X direction or the Z direction may be laminated. In addition, a retardation layer other than the liquid crystal diffraction elements may be disposed on a surface or between layers. As a result, the effect of increasing the diffraction efficiency or widening the diffraction angle can be expected.

It is preferable that λ/4 plates 27 and 28 (refer to FIG. 2) are disposed on an incident surface and an emission surface of the transmissive liquid crystal diffraction element 23. The transmissive liquid crystal diffraction element 23 efficiently diffracts circularly polarized light. Therefore, linearly polarized light emitted from the polarization controller 21 is converted into circularly polarized light by the λ/4 plates 27 and 28 (refer to FIG. 2) such that the diffraction efficiency can be increased. An axial angle of a circularly polarizing plate may be appropriately adjusted depending on a direction in which circularly polarized light is diffracted by the transmissive liquid crystal diffraction element 23.

Light emitted from the transmissive liquid crystal diffraction element 23 is circularly polarized light, and in a case where a LCOS is used as the deflection element 25, linearly polarized light needs to be incident in a direction matched to a liquid crystal slow axis of the LCOS. Therefore, by disposing the λ/4 plate 28 on the emission surface side of the transmissive liquid crystal diffraction element 23, emitted circularly polarized light can be converted into linearly polarized light, and the light can be deflected by the LCOS. In this case, by disposing the λ/4 plate 28 on the emission side and disposing the λ/4 plate 27 on the incidence side in the transmissive liquid crystal diffraction element 23 such that slow axes thereof are orthogonal to each other, the polarization state during the emission can be adjusted to the polarization state during the incidence.

The wavelength λ of the λ/4 plates 27 and 28 refers to a wavelength of the incidence light Li (refer to FIG. 2). As described below, the wavelength λ of incidence light is a central wavelength of the incidence light. Hereinafter, unless specified otherwise, the wavelength λ of incidence light refers to a central wavelength of the incidence light.

It is preferable that, at the wavelength λ [nm] of incidence light, a difference Δn in refractive index of a liquid crystal compound used in the transmissive liquid crystal diffraction element 23, a film thickness d of the transmissive liquid crystal diffraction element 23, and the wavelength λ of the incidence light satisfy Expression (1).

$$\lambda/2 - \lambda/10 \le \Delta n \times d \le \lambda/2 + \lambda/10 \tag{1}$$

The difference Δn in refractive index of the liquid crystal compound, the film thickness d of the transmissive liquid crystal diffraction element 23, and the wavelength λ of the incidence light described above satisfy more preferably $\lambda/2-\lambda/11\leq\Delta n\times d\leq\lambda/2+\lambda/11$ and still more preferably $\lambda/2-\lambda/12\leq\Delta n\times d\leq\lambda/2+\lambda/12$.

By setting $\Delta n\times d$ that is the product of the difference $\Delta n$ in refractive index of the liquid crystal compound and the film thickness d of the transmissive liquid crystal diffraction element 23 to be in the above-described range, light can be more efficiently diffracted.

As described above, the wavelength $\lambda$ of incidence light is a central wavelength of the incidence light.

In a case where the incidence light is light where a plurality of peak wavelengths are discretely present, the central wavelength of the incidence light is acquired using a root mean square (RMS) method. The plurality of discrete peak wavelengths are measured using an optical spectrum analyzer.

In a case where the incidence light is light where a plurality of peak wavelengths are not discretely present, a spectrum of the incidence light is measured using an optical spectrum analyzer. Among two wavelengths having a height that is ½ of a maximum peak height in the measured spectrum, in a case where a value of a shorter wavelength is represented by $\lambda 1$ (nm) and a value of a longer wavelength is represented by $\lambda 2$ (nm), the central wavelength and a half-width can be acquired from the following expression.
Reflection center wavelength$=(\lambda 1+\lambda 2)/2$ $$\text{Half-width} = (\lambda 2 - \lambda 1)$$

[Deflection Element]

As the deflection element used in the present invention, a well-known deflection element used for a wavelength selective switch may be used. Examples of the deflection element include a Miro Electro mechanical systems (MEMS) mirror and a LCOS.

The deflection element is, for example, a polarization control phase modulator that changes a phase of incident light based on an applied voltage to control deflection of the incident light.
[Output Port]

Light having each of wavelengths is switched to the desired output port 26 by the deflection element 25. The number of the output ports 26 may increase or decrease as necessary. In addition, the input ports 20 and the output ports 26 are suitably configured by optical waveguide members such as optical fibers.

As described above, in the first embodiment, a wavelength selective switch where crosstalk is improved and miniaturization is realized can be constructed.

Second Embodiment

Figure 4:
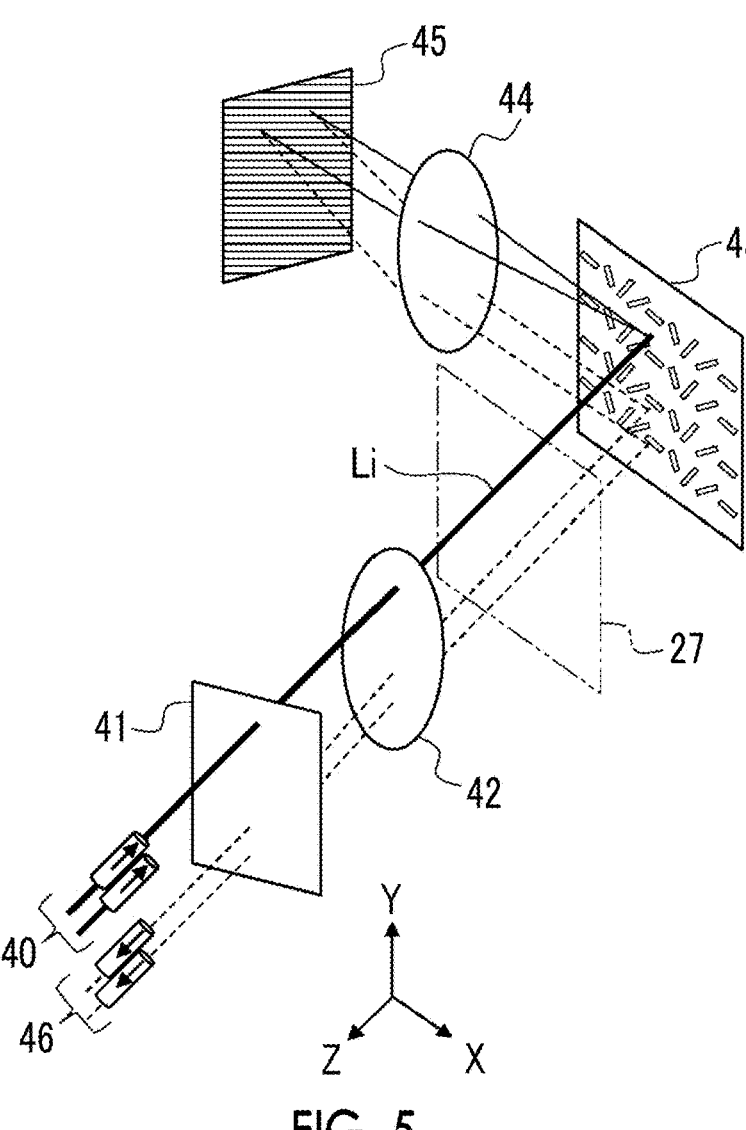
FIG. 4 is a conceptual diagram showing a configuration of a wavelength selective switch 2 according to a second embodiment of the present invention.
Figure 4:

FIG. 4 is a conceptual diagram showing a configuration of a wavelength selective switch 2 according to a second embodiment of the present invention. The wavelength selective switch 2 includes: one or more input ports 40; one or more output ports 46; a polarization controller 41 that adjusts a polarization state of light incident from the input ports; a lens 42 that converts polarization-adjusted light into parallel light; a reflective liquid crystal diffraction element 43 that demultiplexes wavelength-multiplexed light (incidence light Li) incident from the input ports; a lens 44 that converts light demultiplexed and spreading in a wavelength dispersion direction into parallel light; and a deflection element 45 that controls deflection of the demultiplexed light.

In the present embodiment, the transmissive liquid crystal diffraction element 23 of FIG. 2 is replaced with the reflective liquid crystal diffraction element 43.

In addition, the input ports 40 and the output ports 46 have the same configurations as the input ports 20 and the output ports 26 described above, and are suitably configured by optical waveguide members such as optical fibers.
[Reflective Liquid Crystal Diffraction Element]

Figure 5:
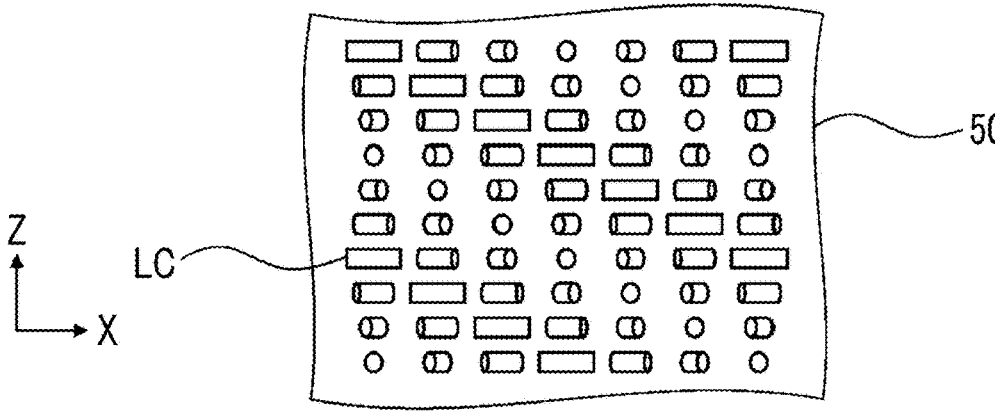
FIG. 5 is a cross-sectional view showing a reflective liquid crystal diffraction element.

In the present embodiment, the reflective liquid crystal diffraction element 43 is used as the dispersive element. The reflective liquid crystal diffraction element 43 is in a state where the liquid crystal compounds LC forming a cholesteric liquid crystal layer 50 are two-dimensionally disposed in the X direction and the Z direction as shown in FIG. 5. As in the transmissive liquid crystal diffraction element, the reflective liquid crystal diffraction element hardly generates higher-order light during reflection. Therefore, the occurrence of crosstalk by higher-order light can be suppressed.

The cholesteric liquid crystal layer 50 has the liquid crystal alignment pattern in which the optical axis changes while continuously rotating in the X direction in a plane (the predetermined one direction).

The cholesteric liquid crystal layer obtained by immobilizing a cholesteric liquid crystalline phase typically reflects incident light (circularly polarized light) by specular reflection.

On the other hand, the cholesteric liquid crystal layer 50 having the above-described liquid crystal alignment pattern reflects incident light in a direction having an angle in the X direction with respect to specular reflection. Specifically, as shown in FIG. 5, the cholesteric liquid crystal layer 50 does not reflect the light incident from the normal direction in the normal direction, but reflects the light in a direction tilted with respect to the normal direction. That is, the light incident from the normal direction refers to light incident from the front side, that is, light that is vertically incident into a main surface. The main surface refers to the maximum surface of a sheet-shaped material.

A reflection angle of light from the cholesteric liquid crystal layer 50 in which the optical axis of the liquid crystal compound LC continuously rotates in the one direction (X direction) varies depending on wavelengths of light to be reflected. Specifically, as the wavelength of light increases, the angle of reflected light with respect to incidence light increases. Due to the action, the reflective liquid crystal diffraction element 43 functions as a dispersive element that separates the wavelengths of the wavelength-multiplexed incidence light Li (refer to FIG. 4).

In addition, the reflection angle of light from the cholesteric liquid crystal layer 50 can be adjusted by changing the length $\Lambda$ of the single period in the liquid crystal alignment pattern as in the above-described transmissive liquid crystal diffraction element. Specifically, as the length $\Lambda$ of the single period decreases, the reflection angle increases. Therefore, the distance between the reflective liquid crystal diffraction element 43 and the lens 44 can be reduced, and the size of the device can be reduced.

It is preferable that $\lambda/4$ plate 27 (refer to FIG. 4) is disposed on an incident surface of the reflective liquid crystal diffraction element 43. The reflective liquid crystal diffraction element 43 efficiently diffracts circularly polarized light. Therefore, linearly polarized light emitted from the polarization controller 41 is converted into circularly polarized light by the $\lambda/4$ plate such that the diffraction efficiency can be increased. An axial angle of a circularly polarizing plate may be appropriately adjusted depending on a direction in which circularly polarized light is reflected by the reflective liquid crystal diffraction element 43.

As described above, the reflective liquid crystal diffraction element 43 reflects light incident from the normal direction in a tilted direction. Therefore, unlike the reflective diffraction grating in the related art, a wavelength selective switch having a configuration that cannot be designed by a dispersive element using only specular reflection may be configured.

As described above, in the second embodiment, a wavelength selective switch where crosstalk is improved and miniaturization is realized can be constructed.

Figures 6, 7:
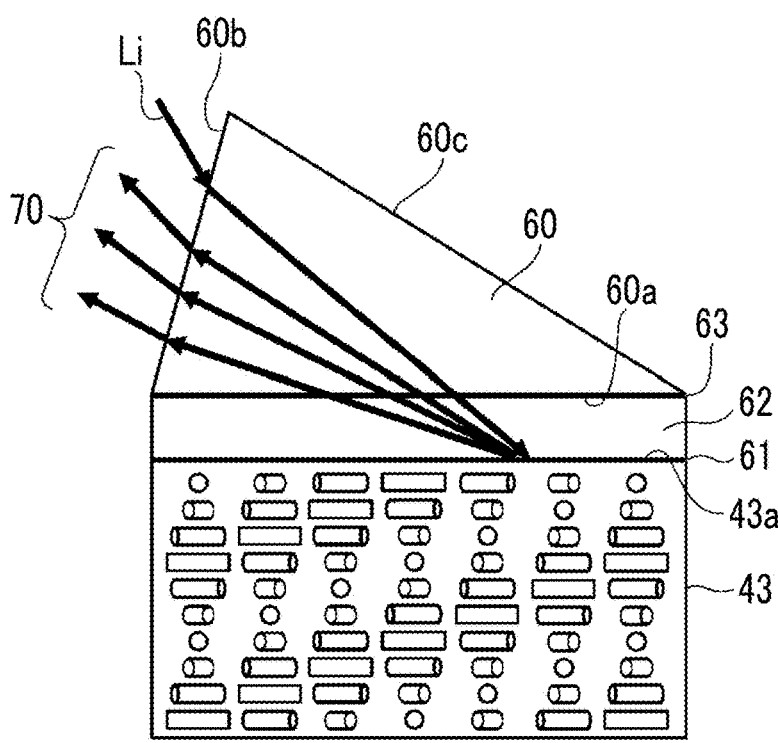
FIG. 6 is a schematic cross-sectional view showing a reflective liquid crystal diffraction element where a light refraction member is provided.
FIG. 7 is a cross-sectional view showing another example of the reflective liquid crystal diffraction element.

In addition, as shown in FIG. 6, a light refraction member 60 such as a prism element or a lens element may be bonded to the reflective liquid crystal diffraction element 43. In this configuration, the incidence light Li can be made obliquely incident into the reflective liquid crystal diffraction element 43. Therefore, the wavelengths of the wavelength-multiplexed incidence light Li (refer to FIG. 4) can be more largely separated, and the size of the device may be further reduced. Further, emitted light 70 is emitted at a refraction angle that varies depending on wavelengths during emission from the light refraction member 60. Therefore, the wavelengths can be more largely separated as compared to a case where the reflective liquid crystal diffraction element 43 is used alone.

In FIG. 6, a λ/4 plate 62 is provided between the reflective liquid crystal diffraction element 43 and the light refraction member 60. A first bonding layer 61 is provided between the reflective liquid crystal diffraction element 43 and the λ/4 plate 62. A second bonding layer 63 is provided between the λ/4 plate 62 and the light refraction member 60.

The light refraction member 60 is, for example, a prism and includes two surfaces 60a and 60b that cross each other at a predetermined angle and a slope surface 60c that connects the two surfaces 60a and 60b. Among the two surfaces 60a and 60b, one surface 60a faces a surface 43a of the reflective liquid crystal diffraction element 43. The slope surface 60c is tilted with respect to the surface 43a of the reflective liquid crystal diffraction element 43.

The incidence light Li is incident into the surface 60b of the light refraction member 60, and is reflected from the reflective liquid crystal diffraction element 43. In this case, the light is reflected at an angle corresponding to the wavelength. Therefore, in a case where the incidence light Li is emitted from the surface 60b, the wavelength-separated emitted light 70 is demultiplexed into a plurality of light components and emitted. The emitted light 70 demultiplexed into the plurality of light components is refracted during the emission from the surface 60b. Therefore, the emitted light 70 further spreads such that the wavelengths are separated.

An incidence direction of light into a prism or a liquid crystal diffraction element can be appropriately determined. In a case where the liquid crystal diffraction element is a transmissive type, from the viewpoint of high diffraction efficiency, an incidence angle θ [degrees] with respect to the normal direction of the surface of the transmissive liquid crystal diffraction element is preferably −25 degrees≤θ≤25 degrees, more preferably −20 degrees≤θ≤20 degrees, and still more preferably −15 degrees≤θ≤15 degrees.

In a case where the liquid crystal diffraction element is a reflective type, from the viewpoints of both large wavelength separation and high efficiency, an incidence angle θ with respect to the normal direction of the surface of the reflective liquid crystal diffraction element is preferably 40 degrees≤θ≤80 degrees, more preferably 45 degrees≤θ≤75 degrees, and still more preferably 50 degrees≤θ≤70 degrees.

In a case where a refractive index of the light refraction member is represented by n and a refractive index of the liquid crystal diffraction element (an average refractive index in a case where the liquid crystal diffraction element is anisotropic) is represented by $n_1$, $n_1-0.1 \leq n \leq n_1+0.1$ is preferable, $n_1-0.075 \leq n \leq n_1+0.75$ is more preferable, and $n_1-0.05 \leq n \leq n_1+0.05$ is still more preferable.

In order to largely separate the wavelengths, it is preferable that a difference between the refractive index of the light refraction member and the refractive index of air (refractive index=1.0) is large. On the other hand, in a case where a difference in refractive index between the light refraction member and the liquid crystal diffraction element is large, the diffraction efficiency may deteriorate due to the interfacial reflection, and thus the above-described range is preferable.

In addition, in order to increase the utilization efficiency of light, an antireflection layer may be provided on an incident surface or a reflecting surface of the light refraction member.

In this configuration, in order to efficiently diffract oblique incident light, the length Λ of the single period of the above-described liquid crystal alignment pattern, the helical pitch of the cholesteric liquid crystalline phase, the film thickness, and the like may be appropriately adjusted.

From the viewpoint of high diffraction efficiency, it is preferable that the film thickness d of the reflective liquid crystal diffraction element, the average refractive index nLC of the liquid crystal compound, and the wavelength λ of the incidence light satisfy Expression (2).

$$d \geq (6 \times \lambda)/nLC \qquad (2)$$

The film thickness d of the reflective liquid crystal diffraction element the average refractive index nLC of the liquid crystal compound, and the wavelength λ of the incidence light satisfy more preferably $d \geq (7 \times \lambda)/nLC$ and still more preferably $d \geq (8 \times \kappa)/nLC$.

In addition, as shown in FIG. 7, the reflective liquid crystal diffraction element 43 may have a configuration where a right-twisted cholesteric liquid crystal layer 52 and a left-twisted cholesteric liquid crystal layer 53 are laminated. As a result, the light can be efficiently diffracted irrespective of the incidence polarization state.

In addition, as described above, it is preferable that the λ/4 plate 62 is disposed between the light refraction member 60 and the reflective liquid crystal diffraction element 43. By appropriately adjusting the phase difference, the slow axis, and the like of the λ/4 plate 62, the light can be more efficiently diffracted.

The phase difference, the slow axis, and the like of the λ/4 plate 62 depend on an incidence angle or a polarization angle of light, and thus may be appropriately adjusted correspondingly. The following ranges are preferable.

In a case where the phase difference of the λ/4 plate at the wavelength λ [nm] of the incidence light is represented by Re(λ) [nm], $\lambda/4 - \lambda/10 \leq Re(\lambda) \leq \lambda/4 + \lambda/10$ is preferable, $\lambda/4 - \lambda/11 \leq Re(\lambda) \leq \lambda/4 + \lambda/11$ is more preferable, and $\lambda/4 - \lambda/12 \leq Re(\lambda) \leq \lambda/4 + \lambda/12$ is still more preferable.

In addition, in a case where an angle between the slow axis of the λ/4 plate and incident linearly polarized light is represented by y [degrees], 15 degrees≤φ≤75 degrees is preferable, 20 degrees≤φ≤70 degrees is more preferable, and 25 degrees≤φ≤65 degrees is still more preferable.

In addition, in order to increase the utilization efficiency of light, an antireflection layer may be provided on an incident surface or a reflecting surface of the light refraction member.

A bonding layer may be provided between the light refraction member, the λ/4 plate, and the reflective liquid crystal diffraction element. For example, as shown in FIG. 6, a first bonding layer 61 may be provided between the reflective liquid crystal diffraction element 43 and the λ/4 plate 62, and a second bonding layer 63 may be provided between the λ/4 plate 62 and the light refraction member 60. As the first bonding layer 61 and the second bonding layer, various bonding layers such as a pressure sensitive adhesive or an ultraviolet (UV) adhesive are used.

A difference between a refractive index of the bonding layer and a refractive index of each of upper and lower members bonded to the bonding layer is preferably 0 to 0.1, more preferably 0 to 0.075, and still more preferably 0 to 0.05. That is, a difference between a refractive index of the first bonding layer 61 and a refractive index of the liquid crystal diffraction element (reflective liquid crystal diffraction element 43) is 0 to 0.1, and a difference between the refractive index of the first bonding layer 61 and a refractive index of the λ/4 plate 62 is preferably 0 to 0.1. Any one of the above-described differences in refractive index is more preferably 0 to 0.075 and still more preferably 0 to 0.05.

In addition, a difference between a refractive index of the second bonding layer 63 and the refractive index of the λ/4 plate 62 is 0 to 0.1, and a difference between the refractive index of the second bonding layer 63 and a refractive index of the light refraction member 60 is preferably 0 to 0.1. Any one of the above-described differences in refractive index is more preferably 0 to 0.075 and still more preferably 0 to 0.05. As described above, by adjusting the refractive indices to the above-described ranges, the interfacial reflection can be reduced, and the light can be more efficiently diffracted.

A difference in refractive index in the reflective liquid crystal diffraction element 43, the first bonding layer 61, the λ/4 plate 62, the second bonding layer 63, and the light refraction member 60 is preferably 0 to 0.1, more preferably 0 to 0.075, and still more preferably 0 to 0.05.

EXPLANATION OF REFERENCES

10, 20, 40: input port
11, 21, 41: polarization controller
12, 22, 42: lens
13: dispersive element
14, 24, 44: lens
15: LCOS
16, 26, 46: output port
23: transmissive liquid crystal diffraction element
25, 45: deflection element
27, 28, 62: λ/4 plate
30A: optical axis of liquid crystal molecule
43: reflective liquid crystal diffraction element
50, 52, 53: cholesteric liquid crystal layer
60: light refraction member
60a, 60b: surface
60c: slope surface
61: first bonding layer
63: second bonding layer

70: emitted light
Li: incidence light

What is claimed is:

1. A wavelength selective switch comprising:
one or more input ports;
one or more output ports;
a polarization controller that adjusts a polarization state of light incident from the input ports;
a dispersive element that demultiplexes wavelength-multiplexed light incident from the input ports; and
a deflection element that controls deflection of the demultiplexed light,
wherein the dispersive element is a liquid crystal diffraction element having a liquid crystal alignment pattern where an orientation of an optical axis derived from a liquid crystal compound changes while continuously rotating in at least one in-plane direction.

2. The wavelength selective switch according to claim 1, wherein the deflection element is a polarization control phase modulator that changes a phase of incident light based on an applied voltage to control deflection of the incident light.

3. The wavelength selective switch according to claim 2, wherein the liquid crystal diffraction element is a transmissive type.

4. The wavelength selective switch according to claim 3, wherein a difference Δn in refractive index of a liquid crystal compound used in the transmissive liquid crystal diffraction element, a film thickness d of the transmissive liquid crystal diffraction element, and a wavelength λ of incidence light satisfy Expression (1), $$\lambda/2 - \lambda/10 \le \Delta n \times d \le \lambda/2 + \lambda/10. \qquad (1)$$

5. The wavelength selective switch according to claim 2, wherein the liquid crystal diffraction element is a reflective type.

6. The wavelength selective switch according to claim 5, wherein a film thickness d of the reflective liquid crystal diffraction element, an average refractive index nLC of a liquid crystal compound, and a wavelength λ of incidence light satisfy Expression (2), $$d \ge (6 \times \lambda)/nLC. \qquad (2)$$

7. The wavelength selective switch according to claim 2, wherein a light refraction member is bonded to the liquid crystal diffraction element.

8. The wavelength selective switch according to claim 7, wherein a λ/4 plate is provided between the liquid crystal diffraction element and the light refraction member.

9. The wavelength selective switch according to claim 8, further comprising:
a first bonding layer that is provided between the liquid crystal diffraction element and the λ/4 plate; and
a second bonding layer that is provided between the λ/4 plate and the light refraction member,
wherein a difference between a refractive index of the first bonding layer and a refractive index of the liquid crystal diffraction element is 0 to 0.1,
a difference between the refractive index of the first bonding layer and a refractive index of the λ/4 plate is 0 to 0.1, a difference between a refractive index of the second bonding layer and the refractive index of the $\lambda/4$ plate is 0 to 0.1, and a difference between the refractive index of the second bonding layer and a refractive index of the light refraction member is 0 to 0.1.

10. The wavelength selective switch according to claim 1, wherein the liquid crystal diffraction element is a transmissive type.

11. The wavelength selective switch according to claim 10, wherein a difference $\Delta n$ in refractive index of a liquid crystal compound used in the transmissive liquid crystal diffraction element, a film thickness d of the transmissive liquid crystal diffraction element, and a wavelength $\lambda$ of incidence light satisfy Expression (1), $$\lambda/2 - \lambda/10 \le \Delta n \times d \le \lambda/2 + \lambda/10. \qquad (1)$$

12. The wavelength selective switch according to claim 11, wherein a light refraction member is bonded to the liquid crystal diffraction element.

13. The wavelength selective switch according to claim 10, wherein a light refraction member is bonded to the liquid crystal diffraction element.

14. The wavelength selective switch according to claim 1, wherein the liquid crystal diffraction element is a reflective type.

15. The wavelength selective switch according to claim 14, wherein a film thickness d of the reflective liquid crystal diffraction element, an average refractive index nLC of a liquid crystal compound, and a wavelength $\lambda$ of incidence light satisfy Expression (2), $$d \ge (6 \times \lambda)/nLC. \qquad (2)$$

16. The wavelength selective switch according to claim 15, wherein a light refraction member is bonded to the liquid crystal diffraction element.

17. The wavelength selective switch according to claim 14, wherein a light refraction member is bonded to the liquid crystal diffraction element.

18. The wavelength selective switch according to claim 1, wherein a light refraction member is bonded to the liquid crystal diffraction element.

19. The wavelength selective switch according to claim 18, wherein a $\lambda/4$ plate is provided between the liquid crystal diffraction element and the light refraction member.

20. The wavelength selective switch according to claim 19, further comprising:

a first bonding layer that is provided between the liquid crystal diffraction element and the $\lambda/4$ plate; and a second bonding layer that is provided between the $\lambda/4$ plate and the light refraction member, wherein a difference between a refractive index of the first bonding layer and a refractive index of the liquid crystal diffraction element is 0 to 0.1, a difference between the refractive index of the first bonding layer and a refractive index of the $\lambda/4$ plate is 0 to 0.1, a difference between a refractive index of the second bonding layer and the refractive index of the $\lambda/4$ plate is 0 to 0.1, and a difference between the refractive index of the second bonding layer and a refractive index of the light refraction member is 0 to 0.1.

* * * * *